United States Patent [19]

Kuroki

[11] 4,305,024
[45] Dec. 8, 1981

[54] MAGNETIC MOTOR

[76] Inventor: Setsuo Kuroki, No. 5-6, Mukonoso 5, Amagasaki-shi, Hyogo-ken, Japan

[21] Appl. No.: 138,627

[22] Filed: Apr. 8, 1980

[30] Foreign Application Priority Data

Feb. 13, 1980 [JP] Japan ................................. 55/16384

[51] Int. Cl.³ .......................................... H02K 37/00
[52] U.S. Cl. .................................. 318/254; 318/138; 310/46; 310/114; 310/80; 310/83
[58] Field of Search ................. 318/138, 254; 310/46, 310/114, 80, 83, 112

[56] References Cited

U.S. PATENT DOCUMENTS

| | | | |
|---|---|---|---|
| 741,325 | 10/1903 | Gibbs | 310/46 X |
| 1,872,313 | 8/1932 | Masterson | 310/46 |
| 2,173,282 | 9/1939 | List | 310/46 X |
| 3,935,487 | 1/1976 | Czerniak | 310/46 |
| 4,025,831 | 5/1977 | Webb | 318/254 |

*Primary Examiner*—Donovan F. Duggan
*Attorney, Agent, or Firm*—William A. Drucker

[57] ABSTRACT

A magnetic motor comprises a plurality of electromagnets connected to an excitation circuit, and a rotor assembly having a plurality of permanent magnets around its periphery and arranged for angular movement. The permanent magnets are movable between the respective adjacent electromagnets. The electromagnets are selectively excited through the excitation circuit for being magnetized to have the same pole as the pole of a respective one of the permanent magnets disposed closely adjacent to them whereby the rotor assembly is caused to angularly move under the influence of magnetic repulsive forces exerted between the respective closely adjacent electromagnets and permanent magnets.

10 Claims, 19 Drawing Figures

MAGNETIC MOTOR

BACKGROUND OF THE INVENTION

Field of the Invention

This invention relates to magnetic motors of the type in which angular movement of a rotor assembly with permanent magnets, effected under the influence of magnetic repulsive and attractive forces exerted between the permanent magnets and the associated fixed electromagnets, is converted into continuous rotation of the output shaft through a transmission mechanism. More specifically, this invention is directed to such magnetic motors which are capable of running in a highly efficient manner and is of the antipollutant and energy-saving type.

In recent years, fuels such as petroleum used to operate internal combustion engines have not been readily and inexpensively available, the internal combustion engines giving rise to air pollution. It has therefore been increasingly desired to provide motors of high efficiency well suited for antipollutant and energy-saving purposes.

SUMMARY OF THE INVENTION

It is an object of this invention to provide a magnetic motor of the type which is lightweight and compact in construction and capable of operating in a highly efficient manner.

Another object is to provide such magnetic motor which is capable of operating to provide the desired torque depending on the load to be carried.

A further object is to provide such magnetic motor which is simple in construction, inexpensive in manufacture, and easy in maintenance.

According to the invention, there is provided a magnetic motor which comprises a housing having a shaft extending therethrough at its center; a rotor assembly having a plurality of permanent magnets around its periphery in equally spaced relation, said rotor assembly being mounted on said shaft within said housing for angular movement about said shaft between fully clockwise and counterclockwise-rotated positions; a plurality of electromagnets mounted on said housing around its circumference in equally spaced relation, said plurality of permanent magnets being movable between the respective adjacent electromagnets, said electromagnets being electrically connected to an excitation circuit, and said electromagnets being selectively excited through said excitation circuit for being magnetized to have the magnetic pole different from the pole of a respective one of said permanent magnets disposed closely adjacent to them whereby said rotor assembly is caused to angularly move under the influence of magnetic repulsive forces exerted between the respective closely adjacent electromagnets and permanent magnets; an output means operatively associated with said housing for rotation about an axis thereof; and a transmission mechanism operatively connected between said rotor assembly and said output means for converting the angular movement of said rotor assembly into continuous rotation of said output means.

Many other advantages and features of the present invention will become manifest to those versed in the art upon making reference to the detailed description and the accompanying drawings in which preferred embodiments of the invention are shown by way of example.

DETAILED DESCRIPTION OF THE PREFERRED EMBODIMENTS

FIGS. 1 to 6 show a first embodiment of the invention. A magnetic motor N generally comprises a housing H including a pair of spaced, opposed circular plates 3,3, and an angularly movable rotor assembly 1 accommodated within the housing, and four electromagnets 6a, 6b, 6c, 6d mounted around the circumference of the housing in equally spaced relation.

Figure 1:
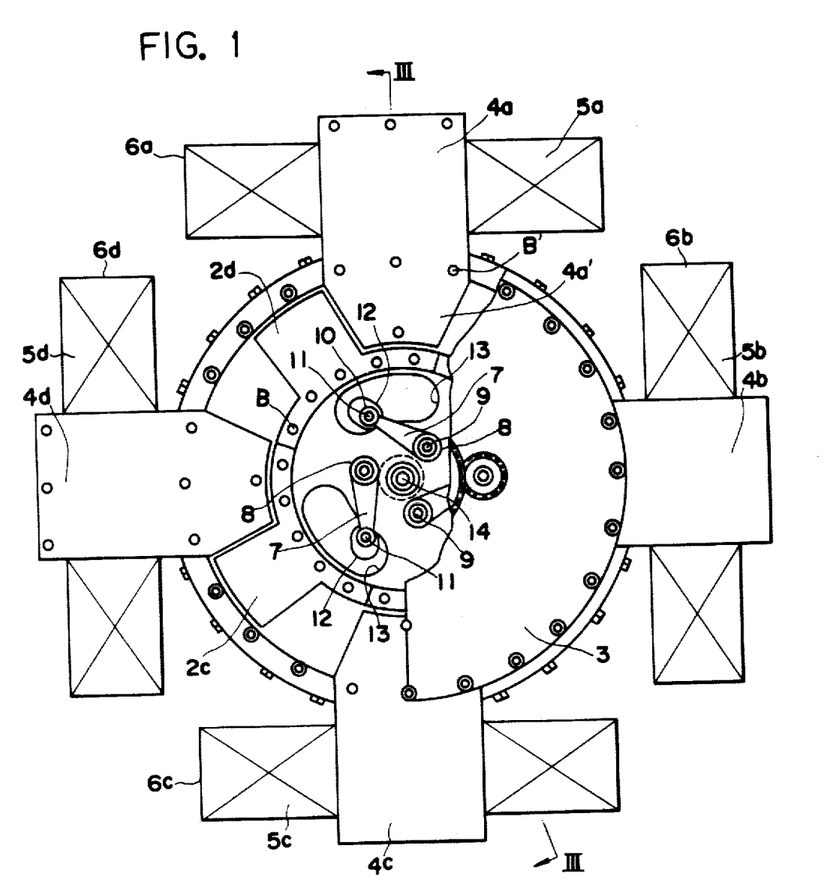
FIG. 1 is a partly broken, front elevational view of a magnetic motor provided in accordance with the present invention.
Figure 3:
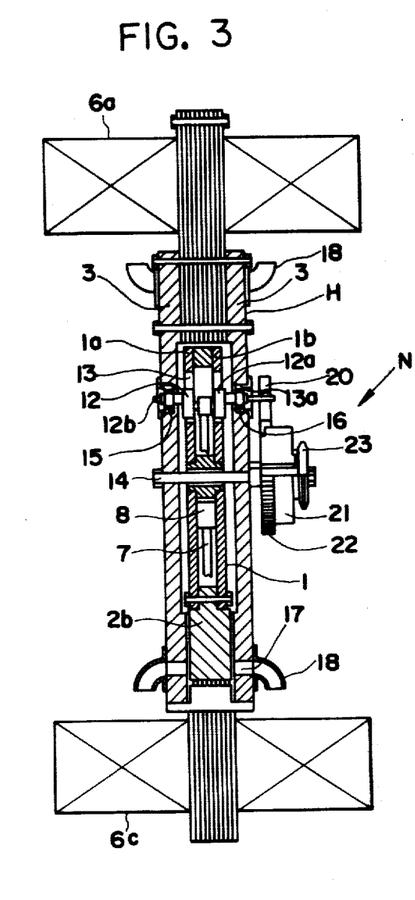
FIG. 3 is a cross-sectional view taken along the line III—III of FIG. 1.

The angularly movable rotor assembly 1 includes a pair of closely spaced, opposed discs 1a, 1b, and four permanent magnets 2a, 2b, 2c, 2d fixedly secured around the circumference of the rotor assembly 1, the four permanent magnets being generally T-shaped and of the same configuration having arcuate base portions 2a', 2b', 2c', 2d' and leg portions 2a'', 2b'', 2c'', 2d'' of generally square shape, respectively. Each of the leg portions is thicker than the base portion and is disposed centrally of the length of the base portion. The base portions 2a' to 2d' are disposed at four equally divided portions of the periphery of the rotor assembly 1 and interposed between the pair of opposed discs 1a, 1b at their peripheral margins. The permanent magnets 2a to 2d are fixedly secured to the pair of discs 1a, 1b by a series of bolts B passing through the disc 1a, the base portions 2a' to 2d' and the disc 1b. With this construction, the leg portions 2a'' to 2d'' extend radially outwardly of the rotor assembly 1, and the leg portions 2a''', 2b'' are disposed in diametrically opposed relationship to the leg portions 2c'', 2d'', respectively. The end face of each leg portion terminates short of the peripheries of the circular plates 3,3. The axes of the leg portions 2a'', 2c'' and the axes of the leg portions 2b'', 2d'' lie respectively on common lines which pass through the centers of the discs 1a, 1b.

Figure 2:
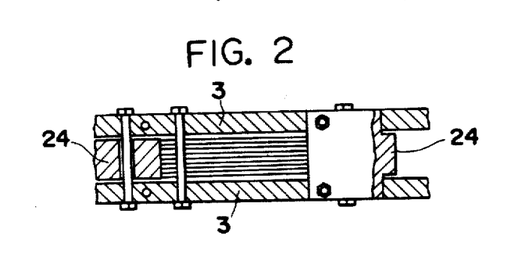
FIG. 2 is a cross-sectional view through the magnetic motor, showing the manner in which cores and peripheral retainers are mounted on a housing.

The electromagnets 6a, 6b, 6c, 6d comprise respectively cores 4a, 4b, 4c, 4d of generally rectangular shape and coils 5a, 5b, 5c, 5d wound around their respective cores, each of the cores having a tapered end 4a' to 4d'. The cores 4a to 4d are interposed between the pair of circular plates 3,3 at their one end portions, including the tapered ends, in equally circumferentially spaced relation. Each of the cores is fixedly secured to the circular plates 3,3 by bolts B' passing through the plate 3, the core and the other plate 3. The rotor assembly 1 is accommodated within the space defined by the pair of circular plates 3,3 and mounted on a shaft 14, extending through the pair of plates 3 and the rotor assembly 1 at their centers for angular movement about the shaft 14 for purposes hereinafter more fully described. With this arrangement, the end face of the tapered end 4a' to 4d' of each core 4a to 4d is disposed closely adjacent to the respective base portion 2a' to 2d'.

Three crank members 12 are mounted on the rotor assembly 1, and a connecting rod 7 is disposed between the pair of discs 1a, 1b and has one end 10 connected to each crank member 12 by a crank pin 11 extending therethrough. The other enlarged end 8 of the connecting rod is pivotally coupled to the rotor assembly by a pin 9 journalled in the pair of discs 1a, 1b and extending through the enlarged end 8. A pair of opposed portions 12a, 12a of the crank member 12 are received respectively in a pair of elongated slots 13 of generally oval shape in the discs 1a, 1b so that the crank member 12 will not interefere with the angular movement of the rotor assembly 1. The journal portions 12b, 12b of the crank member 12 are borne by a pair of bearings 15, 16 mounted in apertures 13a, 13a formed through the circular plates 13,13. A first gear 20 is coupled to the journal portion 12b supported by the bearing 16, and is meshed with a second gear 22 with which flywheel 21 is operatively associated. Output power is provided in the form of rotational movement of a sprocket wheel 23 mounted adjacent to flywheel 21. The gear 22, the flywheel 21 and the sprocket wheel 23 are mounted on that portion of the shaft 14 extending exteriorly of the housing H. In this embodiment, the three first gears 20 are meshingly engaged with the second gear 22 so that the angular movement of the rotor assembly 1 is transmitted to the sprocket wheel 23 through the respective three connecting rods 7, crank members 12 and second gears 20. This angular movement is converted into rotational movement of the sprocket wheel 23 to provide output power.

Four peripheral retainers 24 are interposed between and secured to the circular plates 3,3 at their peripheral margins, the retainers extending between each adjacent cores 4a to 4d to prevent even the slight displacement of the cores out of position in the circumferential direction of the plates 3,3 or the rattle of the cores. The peripheral retainers 24 cooperate with the pair of circular plates 3,3 to completely enclose the rotor assembly 1 so that the moving leg portions 2a'' to 2d'' of the permanent magnets 2a to 2d are not accessible from outside the housing H, thereby preventing foreign matters or the hand of the operater from being accidentally caught in the motor by the moving leg portions 2a'' to 2d''.

Air vent holes 17 are formed through the circular plates 3,3 at their marginal portions as shown in FIG. 3, the vent holes being located between each adjacent cores 4a to 4d. The vent holes 17 serve to reduce the resistance to movement of the leg portions 2a'' to 2d'' between each adjacent cores, and also serve to effect the air-cooling of the cores by the intake and discharge effect produced by the moving leg portions 2a'' to 2d''. Vent ducts 18 are connected to respective vent holes 17.

Figure 4:
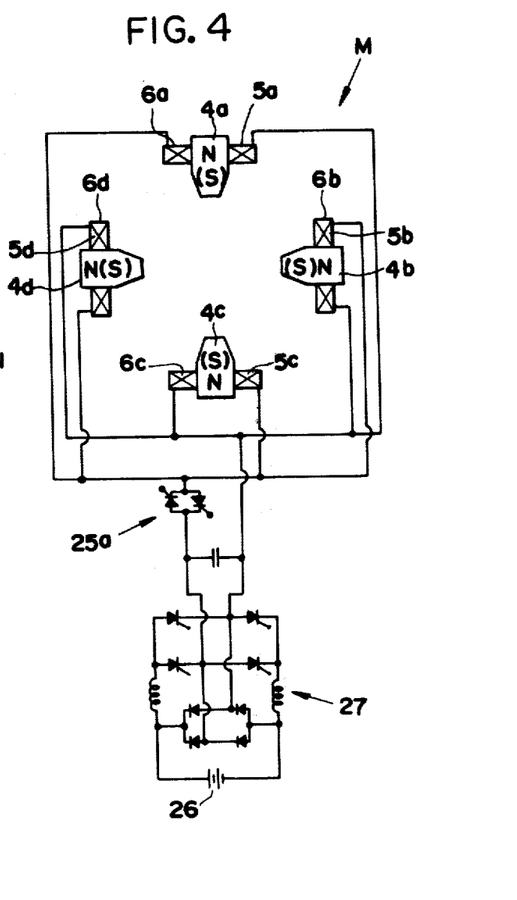
FIG. 4 is a circuit diagram of an excitation circuit.

Each of the cores 4a to 4d comprises a laminated core made of iron or iron alloy such as silicone steel. The terminals of the coils 5a to 5d are connected to an excitation circuit M as shown in FIG. 4. More specifically, the coils 5a to 5d are connected to a single-phase inverter 27 of the improved type comprising a secondary battery 26 acting as a power source and feed-back diodes, one terminals of the coils being connected to the inverter through a thyrister single-phase inverted parallel circuit 25a. Direct current from the secondary battery is converted into alternating current by the inverter 27 so that forward and inverse currents are alternately supplied to the coils 5a to 5d via the thyrister single-phase inverted parallel circuit 25a during alternate halves of each cycle of the alternating current to thereby excite the cores 4a to 4d to allow them to have the poles of alternate north and south polarity.

Figure 5A:
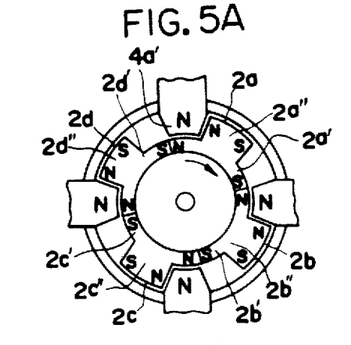
FIGS. 5A to 5D are schematic views of the magnetic motor, showing the sequence of operations of a rotor assembly.
Figure 5B:
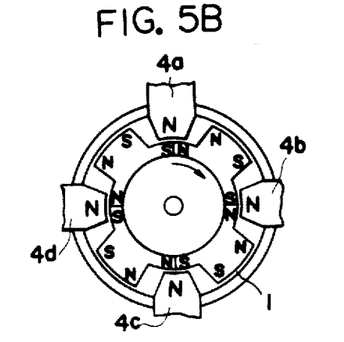
Figure 5C:
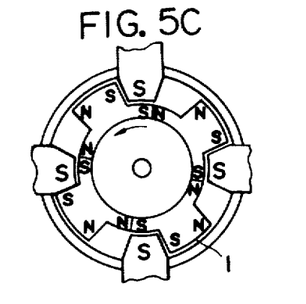
Figure 5D:
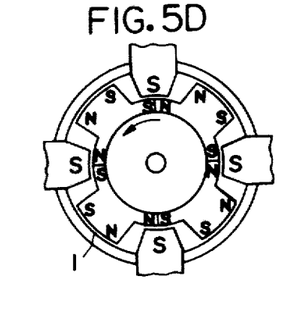

Referring now to FIGS. 5A to 5D which show the sequence of operations of the rotor assembly 1, the rotor assembly 1 is angularly moved about the shaft 14 to its fully counterclockwise-rotated position (FIG. 5A) where one side face of each of the leg portions 2a'' to 2d'' is disposed in parallel, closely spaced relationship to the opposed side face of the tapered portion 4a' to 4d' of the respective adjacent cores 4a to 4d. The rotor assembly 1 is brought into this fully counterclockwise-rotated position when the crank member 12 reaches the dead center. The opposite ends of each base portion 2a' to 2d' and each leg portion 2a'' to 2d'' are of opposite polarity, that is, have the north and the south pole, respectively, as shown in FIGS. 5A to 5D. When the rotor assembly 1 is angularly moved about the shaft 14 into the fully counterclockwise-rotated position with the leg portions 2a'' to 2d'' closely adjacent to the cores 4a to 4d, respectively, the excitation of the cores is stopped whereupon the leg portions 2a'' to 2d'' are caused to move slightly in a clockwise direction under the influence of the flywheel 21 through the intermediary of the crank member 12. The controlled angle of the thyrister single-phase inverted parallel circuit 25a is so predetermined that a trigger pulse is generated from the associated trigger circuit (not shown) when the leg portions 2a'' to 2d'' is caused to slightly move in a clockwise direction. At this time, the cores 4a to 4d are excited to have the same pole as the pole of their respective closely adjacent cores 4a to 4d, for example, the north pole as shown in FIG. 5A. In this condition, there are exerted magnetic repulsive forces between the respective adjacent cores 4a to 4d and leg portions 2a" to 2d" so that the rotor assembly 1 is angularly moved (FIG. 5B) into its fully clockwise-rotated position (FIG. 5C) with the other side face of each of the leg portions 2a" to 2d" disposed in parallel, closely spaced relationship to the opposed side face of the tapered portion of the respective adjacent cores 4b, 4c, 4d, 4a. The rotor assembly 1 is brought into this fully clockwise-rotated position when the crank member 12 reaches the dead center. The rotor assembly 1 is angularly moved from its fully counterclockwise to clockwise-rotated position during one half of each cycle of the alternating current. It is to be noted that magnetic attractive forces are exerted between one ends (the south pole) of each leg and base portions and the respective adjacent cores (the north pole) during the clockwise angular movement of the rotor assembly 1 from the position (FIG. 5B) intermediate the fully counterclockwise and clockwise-rotated positions to the fully clockwise-rotated position (FIG. 5c). This accelerates the angular movement of the rotor assembly 1.

When the rotor assembly 1 reaches the fully clockwise-rotated position (FIG. 5c), the forward current, serving to excite the cores 4a to 4d to allow them to have the north pole, is interrupted whereupon the leg portions 2a" to 2d" are caused to move slightly counterclockwise direction under the influence of the flywheel 21. At this time, inverse current is supplied to the coils 5a to 5d upon generation of a pulse from the trigger circuit (not shown) associated with the thyrister single-phase inverted parallel circuit 25a so that the cores 4a to 4d are excited to have the south pole. In this condition, there are exerted magnetic repulsive forces between the respective adjacent cores 4a to 4d and leg portions 2d, 2a, 2b, 2c so that the rotor assembly 1 is angularly moved into the fully counterclockwise-rotated position (FIG. 5A). Magnetic attractive forces are exerted between the other ends (the north pole) of each leg and base portions and the respective adjacent cores (the south pole) during the counterclockwise angular movement of the rotor assembly 1 between the position (FIG. 5D) intermediate the fully clockwise to counterclockwise-rotated positions to the fully counterclockwise-rotated position (FIG. 5A). This accelerates the angular movement of the rotor assembly 1.

With this construction, the rotor assembly 1 is angularly moved between the fully counterclockwise and clockwise-rotated positions (FIGS. 5A and 5c) by virtue of the magnetic repulsive and attractive forces exerted between the permanent magnets 2a to 2b and the electromagnets 6a to 6d. The angular movement of the rotor assembly 1 is transmitted to the sprocket wheel 23 through the connecting rods 7, the crank members 12, the first gears 20 and the second gears 22. The output power is derived as rotational movement of the sprocket wheel 23. The flywheel 21 serves to store excess energy and to ensure that the revolution of each crank member 12 is not retarded at its dead center.

Figure 6:
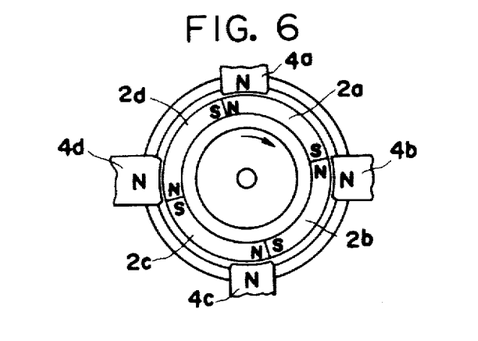
FIG. 6 is a schematic view of the magnetic motor, showing modified permanent magnets.

In this embodiment, a half-wave rectifier may be used so as to excite the coils 5a to 5d only during alternate half cycles. Further, the permanent magnets 2a to 2d may be replaced by those of an arcuate shape which are to be mounted on four equally-divided peripheral portions of the opposed discs 1a, 1b to provide an annular magnet assembly as shown in FIG. 6. In this case, the tapered end 4a' to 4d' of the cores 4a to 4d are reduced in length.

FIGS. 7 to 11 show a second embodiment of the invention which differs from the first embodiment in that a modified excitation circuit M for excitating the cores 4a to 4d and modified permanent magnets 2a to 2d are provided.

Figure 7:
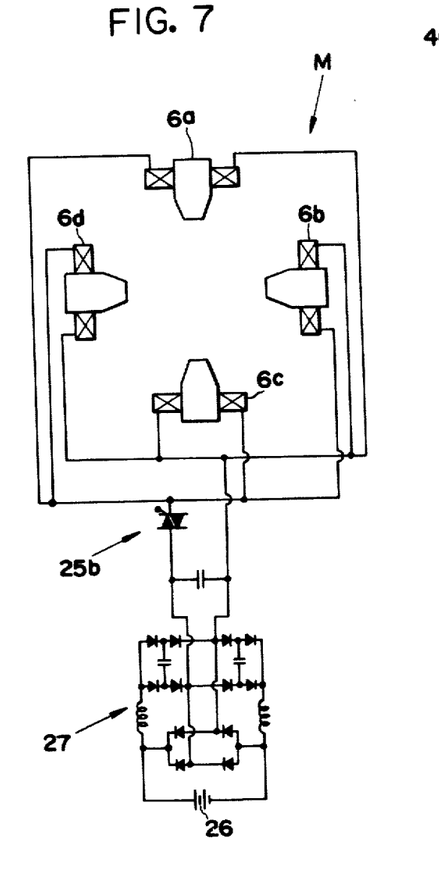
FIG. 7 is a circuit diagram of a modified excitation circuit.
Figure 8A:
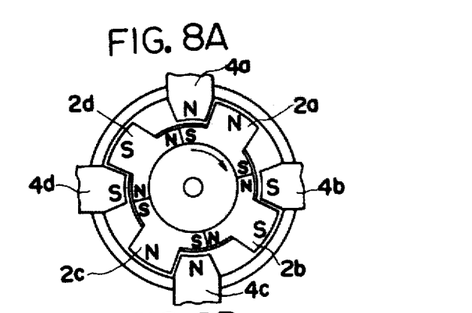
FIGS. 8A to 8D are schematic views of a modified rotor assembly, showing the sequence of operations of the same.
Figure 8B:
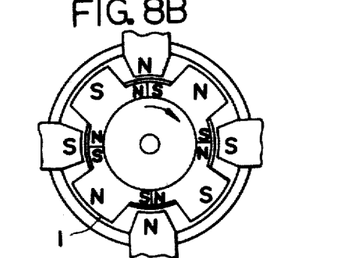

FIG. 7 shows the arrangement of the excitation circuit M. The coils 5a to 5d are connected to a single-phase inverter 27 of the improved type incorporating serially connected diodes and a secondary battery 26 acting as a power source, one terminals of the coils being connected to the inverter through a phase control circuit 25b consisting of a triac (the tradename of the General Electric Company for a gate-controlled semiconductor switch) and a diac. As shown in FIG. 8, the cores 4a to 4d are magnetized by the excitation circuit M so that each core has a pole of different polarity from that of its adjacent cores. More specifically, when the forward current is passed to the coils 5a to 5d through the phase control circuit 25b during one half of each cycle of the alternating current, the cores 4a, 4c and the cores 4b, 4d are magnetized to have the north pole and the south pole, respectively, as shown in FIG. 8. Then, the inverse current flows through the coils 5a to 5d during the other half of each cycle so that the cores 4a, 4c and the cores 4b, 4d are turned into the south pole and the north pole, respectively.

Figure 10:
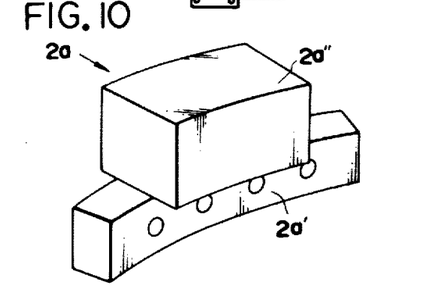
FIG. 10 is a perspective view of the permanent magnet.
Figure 11:
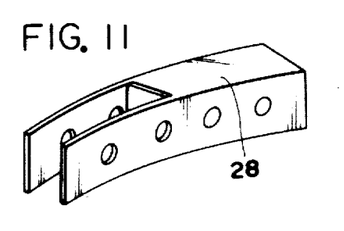
FIG. 11 is a perspective view of a magnetic shield member.

The permanent magnets 2a to 2d are so magnetized that the leg portions 2a" to 2d" have alternate north and south poles, that is, each leg portion has a different magnetic pole with respect to its adjacent leg portions, as shown in FIGS. 8A to 8D. Further, the base portion 2a' to 2d' of each permanent magnet has a magnetic pole different from that of the respective leg portion. The permanent magnet used in this embodiment is best shown in FIG. 10. The permanent magnet comprises the arcuate base portion 2a' to 2d' and the leg portion 2a" to 2d" of a square cross-section, the leg portion being disposed centrally of the length of the base portion, and the base portion being disposed centrally of the width of the leg portion. A shield member 28 of non-magnetic material as shown in FIG. 11 may be used to cover the base portion 2a' to 2d' to prevent the leakage of the magnetic flux.

Figure 8C:
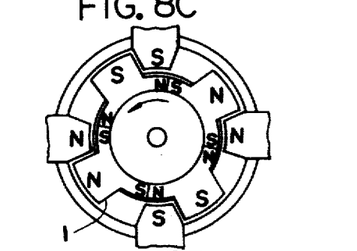
Figure 8D:
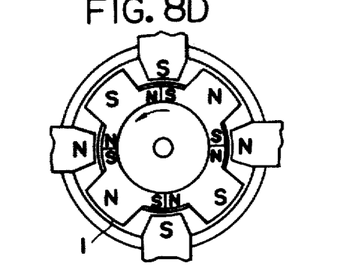
Figure 9A:
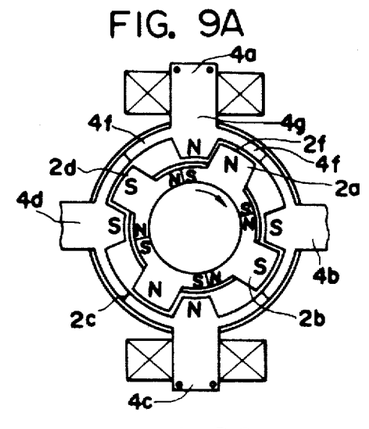
FIGS. 9A to 9D are views similar to FIGS. 8A to 8D but showing modified cores.
Figure 9B:
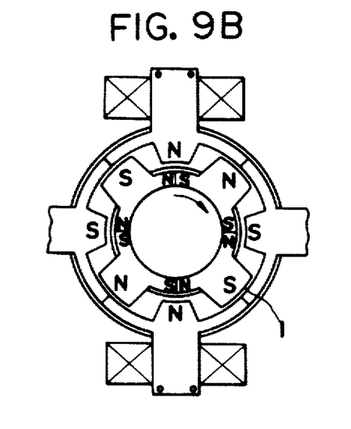
Figure 9C:
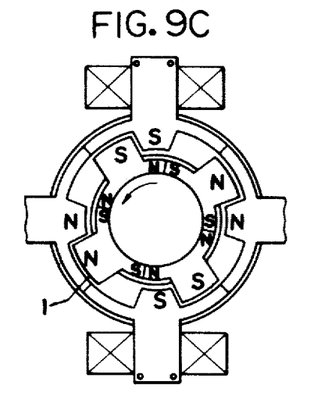
Figure 9D:
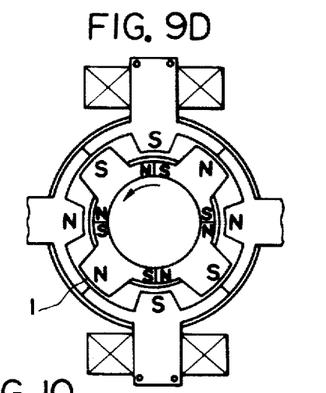

The sequence of operations of the rotor assembly 1 will be described with reference to FIGS. 8A to 8D. The rotor assembly 1 moves angularly slightly about the shaft 14 in a clockwise direction from its fully counterclockwise-rotated position (8A) under the influence of the flywheel 21. At this time, the forward current is passed to the coils 5a to 5d through the phase-control circuit 25b to magnetize the cores 4a to 4d so that two pairs of diametrically opposed cores 4a, 4c and cores 4b, 4d have the north pole and the south pole, respectively. As a result, repulsive forces are exerted between the cores 4a to 4d and the respective closely adjacent leg portions 2a" to 2d" so that the rotor assembly 1 is angularly moved from its fully counterclockwise to clockwise-rotated positions (FIGS. 8A and 8c). Attractive forces are exerted between the cores 4a, 4b, 4c, 4d and the respective adjacent leg portions 2d", 2a", 2b", 2c" between the position (FIG. 8B) intermediate the fully counterclockwise and clockwise-rotated positions (FIGS. 8A and 8c) and the fully clockwise-rotated position (FIG. 8c). This accelerates the clockwise angular movement of the rotor assembly 1. When the rotor assembly reaches its fully clockwise-rotated position (FIG. 8c), the rotor assembly 1 starts angularly moving slightly counterclockwise under the influence of the flywheel 21. At this time, the forward current, flowing through the coils 5a to 5d during one half of each cycle of the alternating current, is interrupted and the inverse current is passed to the coils during the other half of each cycle so that the cores 4a, 4c and the cores 4b, 4d are turned into the south pole and the north pole, respectively. As a result, the rotor assembly 1 is caused to angularly move counterclockwise by virtue of the magnetic repulsive forces exerted between the cores 4a, 4b, 4c, 4d and the respective closely adjacent leg portions 2d", 2a", 2b", 2c". Attractive forces are exerted between the cores 4a to 4d between the position (FIG. 8D) intermediate the fully clockwise and counterclockwise-rotated positions (FIG. 8c and FIG. 8A) and the fully counterclockwise rotated position (FIG. 8A). This operation cycle is repeated so that the angular movement of the rotor assembly 1 is converted into the rotation of the sprocket wheel 2.

Each of the cores 4a to 4d may be of generally T-shaped configuration having a pair of arms 4f extending from the base portion 4g on its opposite sides, as shown in FIGS. 9A to 9D. The arms are of such a length that the arms of the cores 4a to 4d cover the full peripheral margins of the circular plates 3,3 in an uninterrupted manner. With this arrangement, the end face 2f of each leg portion 2a" to 2d" is also closely adjacent to the respective arm 4f when the rotor assembly 1 is in its fully counterclockwise and clockwise-rotated positions. As a result, greater magnetic repulsive forces may be exerted between the respective adjacent cores 4a to 4d and leg portions 2a" to 2d".

FIGS. 12 to 16 show a third embodiment of the invention which differs from the first embodiment only in that the cores 4a to 4d, the excitation circuit M and the permanent magnets 2a to 2d are modified.

Figure 12:
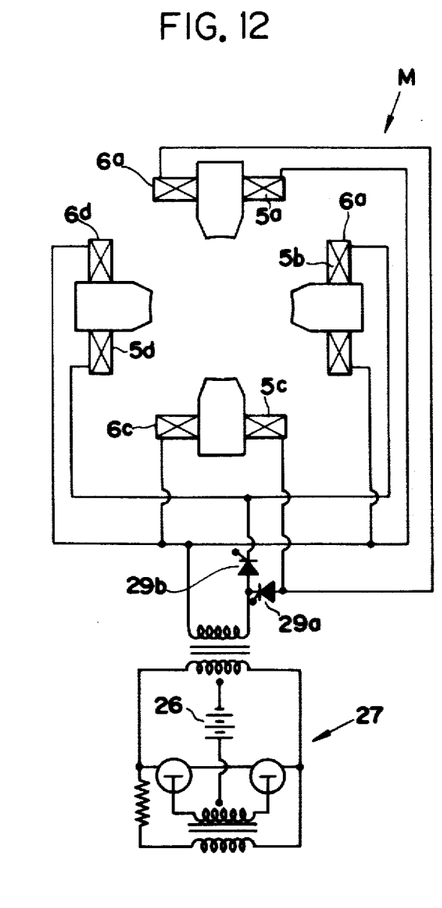
FIG. 12 is a circuit diagram of a modified excitation circuit.
Figure 13:
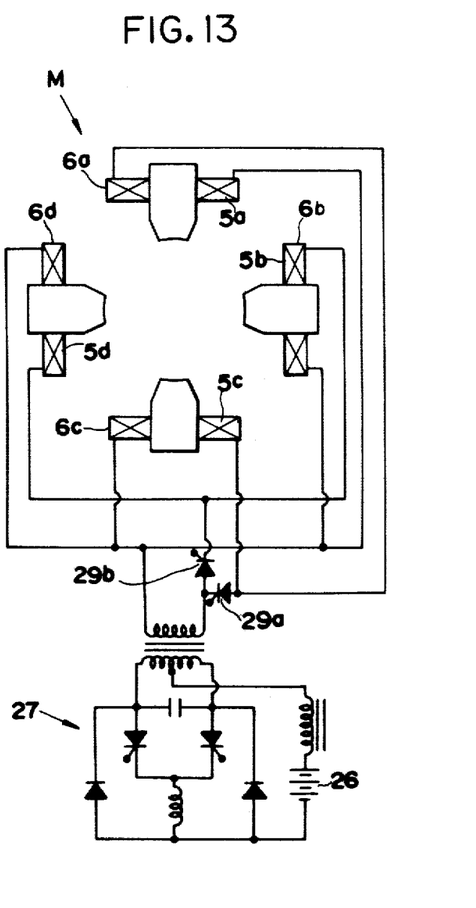
FIG. 13 is a circuit diagram of a further modified excitation circuit.

The excitation circuit M comprises a pair of half-wave rectifiers (i.e., a positive half-wave rectifier 29a and a negative half-wave rectifier 29b), an inverter 27 and a secondary battery 26. As shown in FIGS. 12 and 13, one terminals of the coils 5a, 5c are connected through the positive half-wave rectifier 29a to the inverter 27 while one terminals of the coils 5b, 5d are connected through the negative half-wave rectifier 29b to the inverter 27. With this arrangement of the excitation circuit M, a positive half-wave current passes through the coils 5a, 5c during one half of each cycle of the alternating current, and a negative half-wave current passes through the coils 5b, 5d during the other half of each cycle.

As shown in FIGS. 14A to 14D, a permanent magnet 30 is of generally circular shape having a pair of diametrically opposed leg portions 32a, 32b and a pair of semi-circular portions 31, 31 extending between the leg portions, respectively. The permanent magnet 30 is so magnetized that the leg portions 32a, 32b and the semi-circular portions 31, 31 have the north pole and the south pole, respectively. The rotor assembly 1 is mounted in the housing H in such a manner that the leg portion 32a is disposed between the cores 4a, 4b while the leg portion 32b is positioned between the cores 4c, 4d. Each of the cores 4a to 4d has an arcuate arm 4f disposed in closely spaced relationship to the end face of the leg portion 32a, 32b, the arms 4f, 4f of the cores 4a, 4b and the arms 4f, 4f of the cores 4c, 4d being directed respectively toward each other and disposed in end to end relationship. When the rotor assembly 1 is in its fully counterclockwise and clockwise-rotated positions, the end face of the leg portion 32a, 32b is disposed closely adjacent to the respective arm 4f, so that greater repulsive forces may be exerted between the respective adjacent cores and the leg portions. The semi-circular portions 31, 31 may be covered with a shield member made of non-magnetic material as described above for the shield member 28.

Figure 14A:
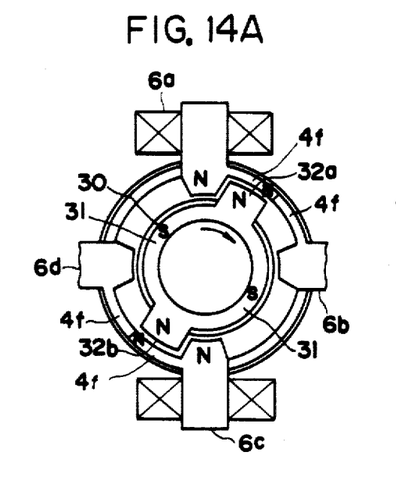
FIGS. 14A to 14D are schematic views of a modified rotor assembly, showing the sequence of operations of the same.
Figure 14B:
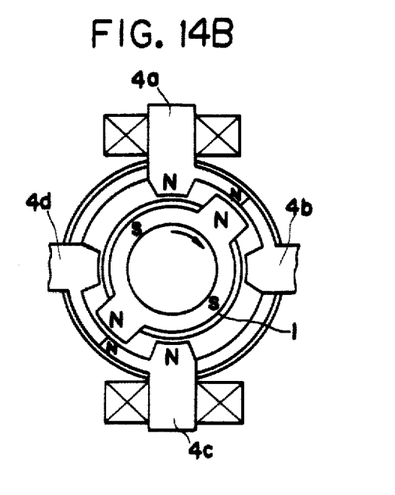
Figure 14C:
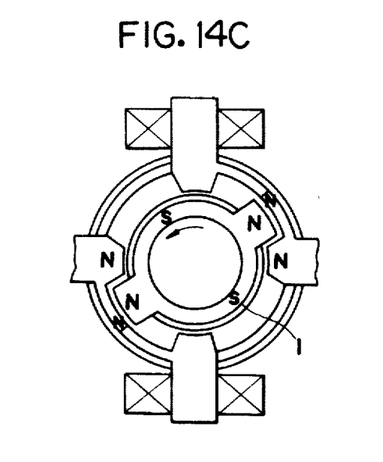
Figure 14D:
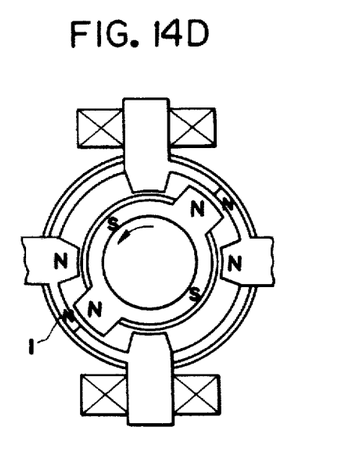

FIGS. 14A to 14D show the sequence of operation of the rotor assembly 1. The rotor assembly 1 moves angularly slightly in a clockwise direction from its fully counterclockwise-rotated position (FIG. 14A) under the influence of the flywheel 21. At this time, the inverse current from the inverter 27 is passed to the coils 5a, 5c through the negative half-wave rectifier 29b so that the cores 4a, 4c and their respective arms 4f, 4f are magnetized to have the north pole whereupon magnetic repulsive forces are exerted between the respective closely adjacent cores 4a, 4c and leg portions 32a, 32b to angularly move the rotor assembly 1 into its fully clockwise-rotated position (FIG. 14c) where the leg portions 32a, 32b are disposed closely adjacent to the cores 4b, 4c, respectively. When the rotor assembly 1 reaches this fully clockwise-rotated position, the supply of the inverse current to the coils 5a, 5c is interrupted and the rotor assembly is caused to angularly move slightly counterclockwise under the influence of the flywheel 21. At this time, the forward current from the inverter 27 is passed to the coils 5b, 5d, which have not been excited because of the presence of the positive half-wave rectifier 29a, through the thyrister of which controlled angle is so predetermined that a trigger pulse is generated from the associated trigger circuit (not shown) when the rotor assembly 1 is in its fully clockwise-rotated position. As a result, magnetic repulsive forces are exerted between the respective closely adjacent cores 4b, 4d and leg portions 32a, 32b to angularly move the rotor assembly 1 into the fully counterclockwise-rotated position (FIG. 14A).

This operation is continuously repeated, and the rotor assembly 1 angularly moves in one direction during one half of each cycle of the alternating current and in the opposite direction during the other half of each cycle. The angular movement of the rotor assembly 1 is converted to rotational movement of the sprocket wheel through the intermediary of the connecting rods 7, the crank members 12, the first gears 20, and the second gear 22.

Figures 15, 16:
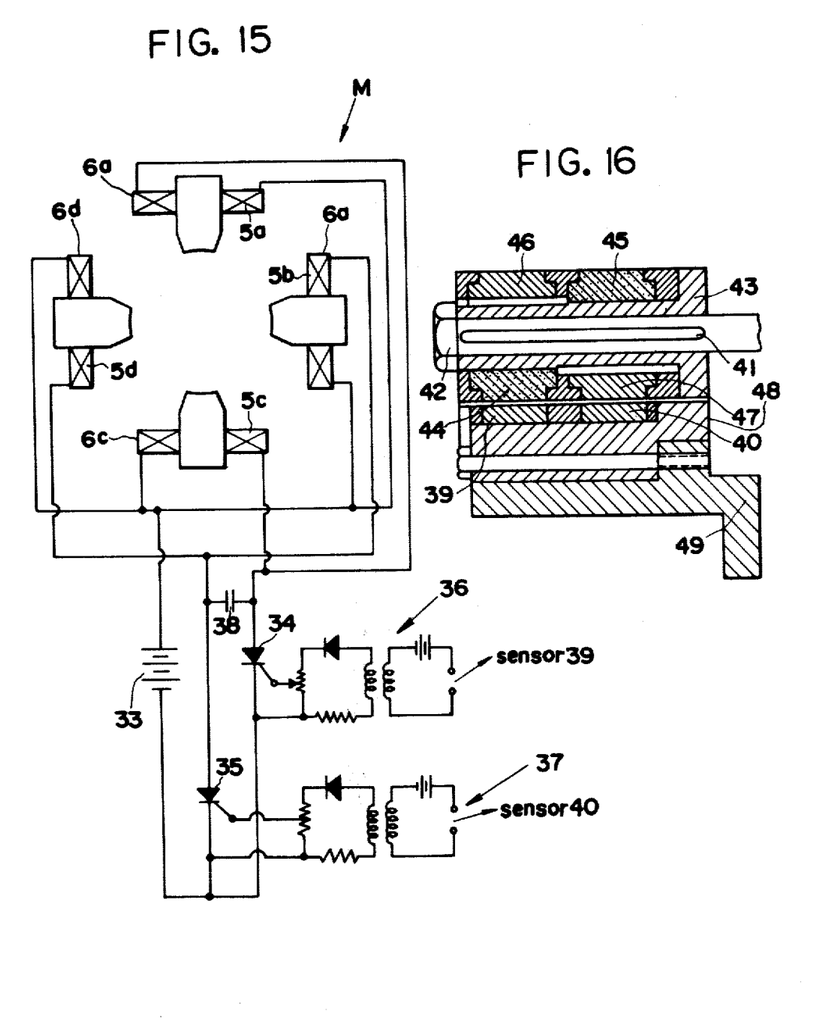
FIG. 15 is a circuit diagram of a modified excitation circuit.
FIG. 16 is a cross-sectional view of sensor means, showing the manner in which cooperating magnets and reed switches are mounted on the magnetic motor.

FIG. 15 shows a modified excitation circuit M incorporating sensors 39, 40. FIG. 16 shows the manner in which the sensors 39, 40 in the form of coating reed switch and magnet are installed.

The excitation circuit M comprises a flip-flop circuit incorporating a battery 33, a pair of thyristers 34, 35, a pair of trigger circuits 36, 37 for the respective thyristers 34, 35, and a commutation capacitor 38. One terminals of the coils 5a, 5c are connected to the thyrister 34 while one terminals of the coils 5b, 5d are connected to the thyrister 35. The excitation circuit M also comprises a pair of sensors 39, 40 for energizing the respective trigger circuits 36, 37.

As shown in FIG. 16, a cylindrical mounting member 43 is mounted by a feather key 41 and a nut 42 on the outer end of the journal portion of each crank member 12, borne by the bearing 15, for rotation with the journal portion about the axis thereof. A pair of non-magnetic rings 46, 47 are attached to the mounting member 43 in side by side relationship, the rings 46, 47 having sensor magnets 44, 45 at their peripheries for actuating the reed switches, respectively. A sensor holding member 48 is mounted on a mounting plate 49 which in turn is secured to the circular plate 3 incorporating the bearing 15. A pair of reed switches 39, 40 are attached to the surface of the sensor holding member 48 facing the non-magnetic rings 46, 47, the reed switches being disposed in closely spaced relationship to the circumferences of the rings 46, 47, respectively. Since the mounting plate 43 is associated with the journal portion of the crank member 12, the mounting plate and hence the rings 46, 47 are rotated upon rotation of the crank member 12. The sensor magnets 44, 45 are displaced 180° with respect to each other, that is, they are disposed in diametrically opposed relationship with respect to the axis of the mounting member 43. The reed switches 39, 40 are disposed in registry with the circumferences of the rings 46, 47, respectively, and upon rotation of the crank member 12, the rings 46, 47 are caused to rotate so that the magnets 44, 45 are alternately brought into registry with the respective reed switches 39, 40 to thereby activate the reed switches. Thus, the reed switches 39, 40 are actuated respectively once per revolution of the rings 46, 47. Pulse signals emitted respectively from the alternately activated reed switches 39, 40 every revolution of the crank member 12 are delivered to the trigger circuits 36, 37 to alternately energize the same so that the thyristers 34, 35 are alternately turned on to excite the coils 5a, 5c during one half of each cycle and the coils 5b, 5d during the other half of each cycle. The operation of the rotor assembly 1 is carried out in a manner as described above for the third embodiment (FIGS. 14A to 14D).

The reed switches 39, 40 serving as the sensors may be replaced by hall elements, photoelectric elements and the like, but it is preferred to use the reed switches since the position of mounting of the reed switches is not so limited. And besides, the associated circuitry may be made relatively simple.

In this embodiment, instead of the reed switches, a governor such as a centrifugally-operated governor may be used for energizing the trigger circuits 36, 37.

Figure 17:
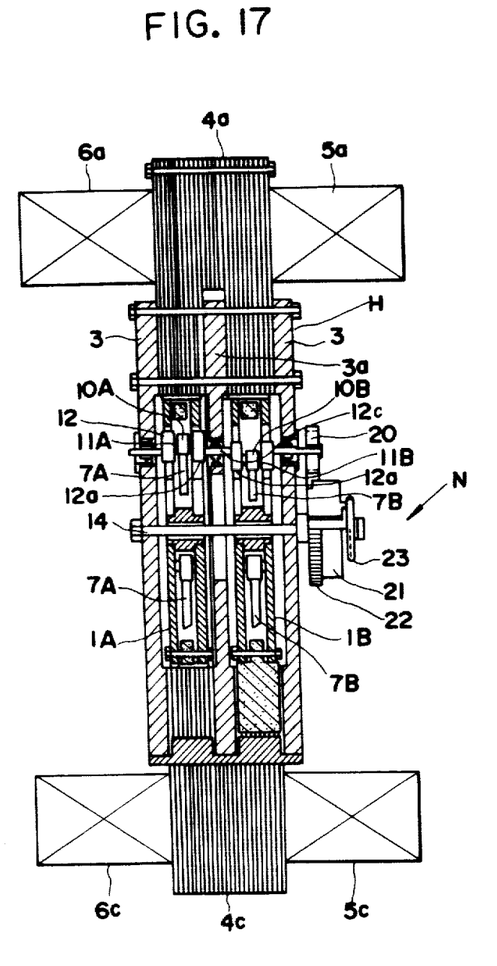
FIG. 17 is a cross-sectional view through a modified magnetic motor incorporating a pair of rotor assemblies.
Figure 18A:
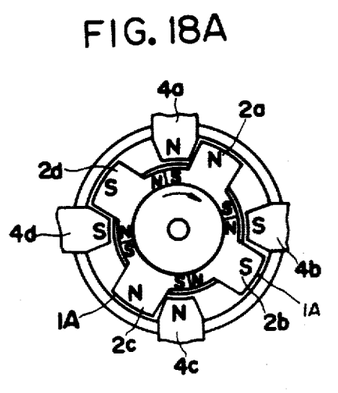
FIGS. 18A to 18D are schematic views of the modified magnetic motor, showing the sequence of operations of one rotor assembly.
Figure 18B:
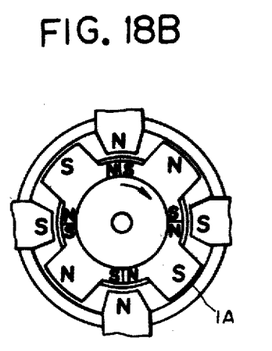
Figure 18C:
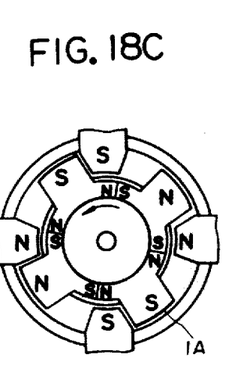
Figure 18D:
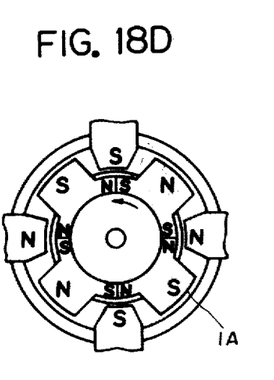
Figure 19A:
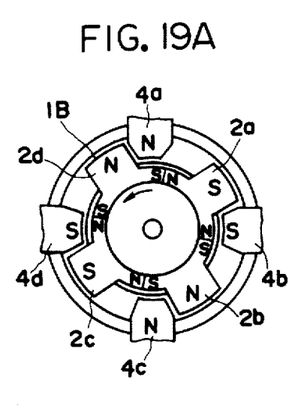
FIGS. 19A to 19D are views similar to FIGS. 18A to 18D but showing the sequence of operations of the other rotor assembly.
Figure 19B:
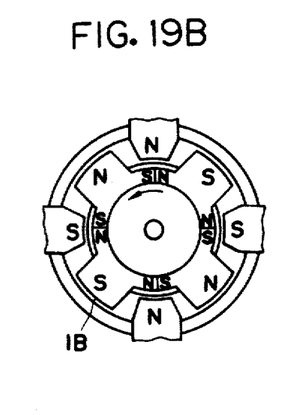
Figure 19C:
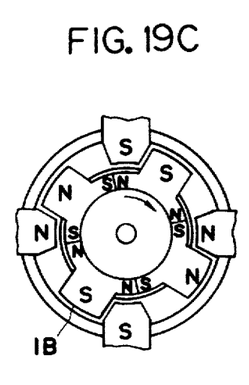
Figure 19D:
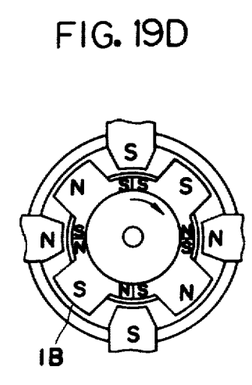

FIGS. 17 to 19 show a fourth embodiment of the invention in which a plurality of (for example, two in the drawings) rotor assemblies are mounted on the common shaft 14 in parallel closely spaced relationship within the housing H.

The magnetic motor N shown in FIG. 17 includes a pair of rotor assemblies 1A, 1B accommodated in a housing H comprising a pair of parallel spaced circular plates 3,3. Equally circumferentially spaced cores 4a to 4d are sandwitched between and supported by the pair of circular plates 3,3, and an insert member 3a is received in a central recess formed in each core. As described above for the first embodiment, four peripheral spacers 24 extend between the respective adjacent cores 4a to 4d.

As shown in FIGS. 18A to 18D and 19A to 19D, the pair of rotor assemblies 1A, 1B are so arranged that they are caused to angularly move in opposite directions and further that the rotor assembly 1A reaches its fully counterclockwise-rotated position when the rotor assembly 1B is brought into its fully clockwise-rotated position and vice versa. To this end, each connecting rod 7A associated with the rotor assembly 1A has one end 10A connected to a respective crank member 12 by a crank pin 11A while each connecting rod 7B associated with the rotor assembly 1B has one end 10B connected to a respective crank member 12 by a crank pin 11B. The cooperating crank members 12, 12 of the rotor assemblies 1A, 1B are interconnected by a connecting pin 12c, and the crank pins 11A and 11B are dispaced 180° from each other with respect to the connecting pin 12c. With this construction, the crank members 12 are rotated when the rotor assemblies 1A, 1B are angularly moved in opposite directions, i.e., clockwise and counterclockwise and vice versa, respectively. As described above for the preceding embodiments, the rotation of each coacting crank members is transmitted to a sprocket wheel 25 through the intermediary of a first gear 20 and a second gear 22.

The leg portions 2a'', 2c'' and leg portions 2b'', 2d'' of the rotor assembly 1A are magnetized to have the north pole and the south pole, respectively, as shown in FIGS. 18A to 18D. The leg portions 2a'', 2c'' and leg portions 2b'', 2d'' of the rotor assembly 1B are magnetized to have the south pole and the north pole, respectively, as shown in FIGS. 19A to 19D.

An excitation circuit M for excitating the coils 5a to 5d is similar to that shown in FIG. 4 or FIG. 7. The structure of this embodiment is similar to that of the first embodiment except for the above-mentioned points.

The operations of the rotor assemblies will be described with reference to FIGS. 18A to 18D and FIGS. 19A to 19D.

When the rotor assembly 1A is angularly moved into its fully counterclockwise-rotated position (FIG. 18A) with the leg portions 2a'' to 2d'' disposed closely adjacent to the cores 4a to 4d, respectively, the coils 5a to 5d are de-energized. On the other hand, corresponding to this counterclockwise movement of the rotor assembly 1A, the rotor assembly 1B is angularly moved into its fully clockwise-rotated position (FIG. 19A) with the leg portions 2a'' to 2d'' disposed closely adjacent to the cores 4b, 4c, 4d, 4a, respectively. At this time, the forward current is supplied to the coils 5a to 5d through the above-mentioned thyrister single-phase inverted parallel circuit 25a or phase controll circuit 25b so that the cores 4a, 4c and the cores 4b, 4d are magnetized to have the north pole and the south pole, respectively. In this condition, magnetic repulsive forces are exerted between the respective leg portions 2a'' to 2d'' of the rotor assemblies 1A, 1B and their respective adjacent cores 4a to 4d so that the rotor assemblies 1A, 1B are caused to angularly move in clockwise and counterclockwise directions, respectively. When the rotor assemblies 1A, 1B reach the fully clockwise-rotated position (FIG. 18c) and the fully counterclockwise-rotated position (FIG. 19c), respectively, the forward current is interrupted and the inverse current is supplied through the excitation circuit M so that the cores 4a, 4c and the cores 4b, 4d are magnetized to have the south pole and the north pole, respectively. As a result, magnetic repulsive forces are exerted between the respective leg portions of the rotor assemblies 1A, 1B and their respective adjacent cores 4a to 4d so that the rotor assemblies 1A, 1B are angularly moved into the fully counterclockwise and clockwise-rotated positions (FIG. 18A and FIG. 19A), respectively.

As described above for the preceding embodiments, magnetic attractive forces are exerted between the respective leg portions 2a'' to 2d'' and the opposed cores 4a to 4d between the position (FIG. 18B or FIG. 18D and FIG. 19B or FIG. 19D) intermediate the fully clockwise or counterclockwise-rotated position and the fully clockwise or counterclockwise-rotated positions (FIG. 18C or FIG. 18A and FIG. 19C and FIG. 19A). This accelerates the angular movement of the rotor assemblies 1A, 1B.

The above operation is repeated, and the rotor assembly 1A or 1B is angularly moved in one direction during one half of each cycle of the alternating current and in the opposite direction during the other half of each cycle. The angular movement of the rotor assemblies 1A, 1B causes the crank members 12 to rotate in one direction to rotate the sprocket wheel 23 through the above mentioned gear mechanism.

More than three rotor assemblies may be provided in the manner mentioned above. Since each adjacent rotor assemblies are arranged to angularly move in opposite directions, the vibration generated by the magnetic motor N and hence the vibration imparted to the foundation to which the magnetic motor is secured are reduced. Further, since a plurality of rotor assemblies of identical construction can be employed, the standardization of such magnetic motor is made simple and hence the manufacturing cost is reduced. In addition, with such multi-rotor assembly, increased power output is achieved.

Since the common cores 4a to 4d can be used irrespective of the number of the rotor assemblies, material costs are not increased.

The excitation circuit M may employ inverters of the type other than those illustrated in the drawings. For example, where a VVVF inverter, in which voltage and frequency are variable, is used, the speed of angular movement of the rotor assembly can be controlled by varying the switching frequency of power transistors or the like constituting the inverter portion of the inverter, and the output voltage can be varied by controlling the DC-DC converter portion. Thus, the magnetic motor can be efficiently operated in a reliable, highly energy-saving manner depending on the variable speed operation and load torque involved.

With the arrangement of the magnetic motors N, magnetic repulsive and attractive forces are exerted between the permanent magnets 2a to 2d, attached to the rotor assembly 1 or assemblies 1A, 1B, and the co-acting electromagnets 6a to 6d to thereby angularly move the rotor assembly or assemblies in either direction so that this angular movement is converted through the associated transmission mechanism into continuous rotational movement of the output means, i.e., the sprocket wheel in an efficient manner. The electromagnets 6a to 6d are selectively excited through the excitation circuit M to ensure that continuous and smooth rotation of the output means is achieved.

The component parts such as the rotor assembly and the circular plates can be made of plastics material or light alloy so that the overall weight of the magnetic motor can be substantially reduced.

The rotor assembly 1 or assemblies 1A, 1B are designed to angularly move a predetermined degree between the fully counterclockwise and clockwise-rotated positions so that they are subjected to less centrifugal force in comparison with the conventional motors in which the rotor assemblies are caused to rotate. As a result, the strength of the supporting means for the permanent magnets and the rotor assembly as well as the strength of the circular plates do not need to be increased so much. And besides, the manufacturing procedure is simplified and the number of the component parts required is reduced.

What is claimed is:

1. A magnetic motor which comprises:
   (a) a housing having a shaft extending therethrough at its center;
   (b) a rotor assembly having a plurality of permanent magnets around its periphery in equally spaced relation, said rotor assembly being mounted on said shaft within said housing for angular movement about said shaft between fully clockwise and counterclockwise-rotated positions;
   (c) a plurality of electromagnets mounted on said housing around its circumference in equally spaced relation, said plurality of permanent magnets being movable between the respective adjacent electromagnets, said electromagnets being electrically connected to an excitation circuit, and said electromagnets being selectively excited through said excitation circuit for being magnetized to have the same magnetic pole as the pole of a respective one of said permanent magnets disposed closely adjacent to them whereby said rotor assembly is caused to angularly move under the influence of magnetic repulsive forces exerted between the respective closely adjacent electromagnets and permanent magnets;
   (d) an output means operatively associated with said housing for rotation about an axis thereof; and
   (e) a transmission mechanism operatively connected between said rotor assembly and said output means for converting the angular movement of said rotor assembly into continuous rotation of said output means.

2. A magnetic motor according to claim 1, in which said rotor assembly comprises a pair of closely spaced, opposed discs, and the number of each of said electromagnets and said permanent magnets is four, said permanent magnets being attached to said pair of discs around its peripheries in equally spaced relationship to each other, said housing comprising a pair of spaced, opposed circular plates, and said electromagnets being interposed between the opposed peripheral margins of said circular plates.

3. A magnetic motor according to claim 2, in which each of said permanent magnets includes a body of generally T-shape having an arcuate base portion and a leg portion extending from said base portion, the arcuate base portions being interposed between the opposed peripheral margins of said discs in end to end relation to one another, and each of said leg portions extending radially outwardly of said discs.

4. A magnetic motor according to claim 2, in which a plurality of coacting crank members and connecting rods, which constitute part of said transmission mechanism, are mounted on and operatively associated with said pair of discs.

5. A magnetic motor according to claim 1, in which a plurality of rotor assemblies are mounted on said shaft within said housing and are angularly moved in opposite directions with respect to their respective adjacent ones, the plurality of rotor assemblies being operatively engaged to one another through transmission means.

6. A magnetic motor according to claim 1, in which said excitation circuit includes a DC power source and an inverter for converting direct current from said power source into alternating current, the forward current through said excitation circuit exciting said electromagnets during one half of each cycle of the alternating current, and the inverse current exciting said electromagnets during the other half of each cycle, so that said electromagnets are magnetized to be of alternate north and south polarity.

7. A magnetic motor according to claim 1, in which said excitation circuit includes a DC power source and an inverter for converting direct current from said power source into alternating current, the forward current through said excitation circuit exciting said electromagnets during one half of each cycle of the alternating current so that each electromagnet is magnetized to have a predetermined pole which is different from the poles of its adjacent electromagnets, and the inverse current then exciting said electromagnets during the other half of each cycle so that said each electromagnet is magnetized to have the other pole which is different from its adjacent electromagnets.

8. A magnetic motor according to claim 1, in which the alternate electromagnets are selectively excited through said excitation circuit for being magnetized.

9. A magnetic motor according to claim 1, in which sensor means is operatively engaged to said rotor assembly for activating said excitation circuit so that the activation is effected in synchronism with the angular movement of said rotor assembly.

10. A magnetic motor according to claim 9, in which said sensor means comprises a pair of reed switches mounted on said housing and a pair of magnets operatively engaged to said rotor assembly for selectively activating said pair of reed switches, respectively.

* * * * *